Feb. 18, 1930. C. T. DRAPER 1,748,036
METHOD OF MAKING SHEET METAL BARRELS OR DRUMS
Filed Dec. 6, 1924   3 Sheets-Sheet 1
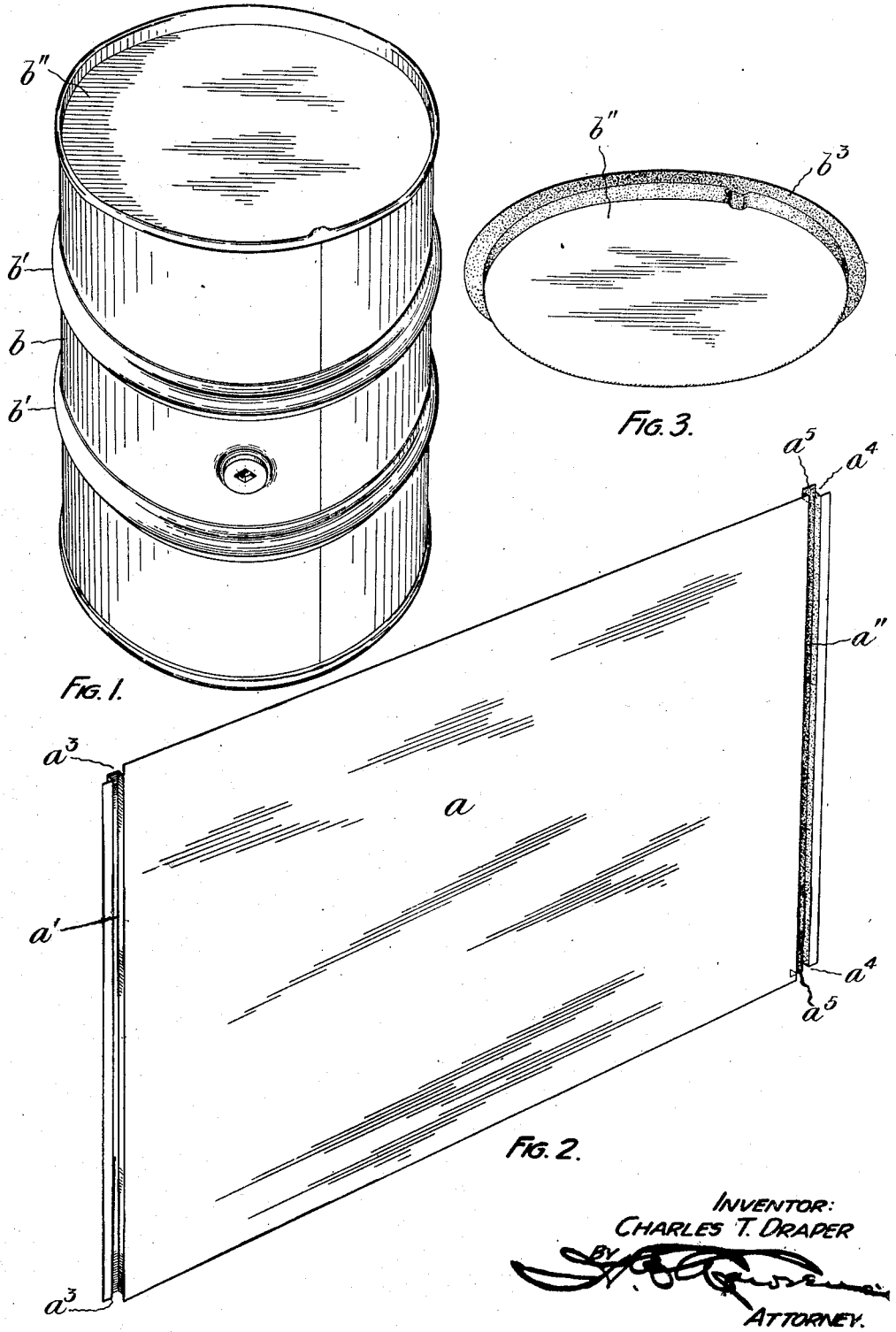
INVENTOR:
CHARLES T. DRAPER
BY
ATTORNEY.

Feb. 18, 1930.                C. T. DRAPER                 1,748,036
              METHOD OF MAKING SHEET METAL BARRELS OR DRUMS
                      Filed Dec. 6, 1924           3 Sheets-Sheet 2
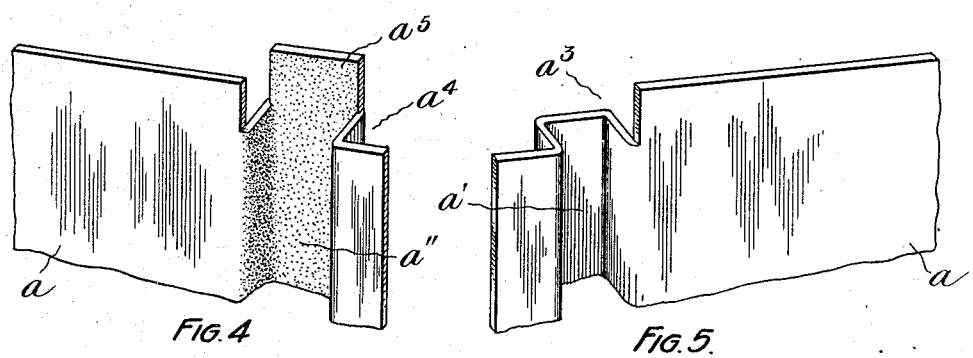
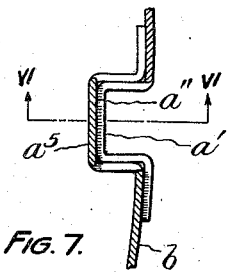
FIG. 7.
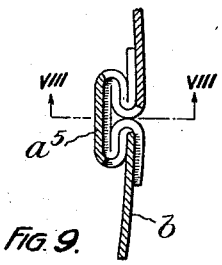
FIG. 9.
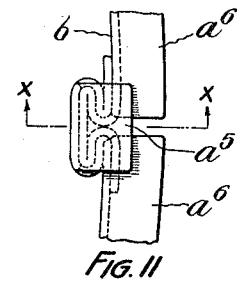
FIG. 11.
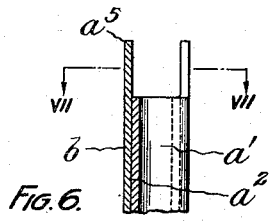
FIG. 6.
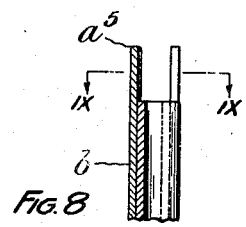
FIG. 8.
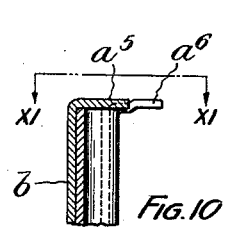
FIG. 10.
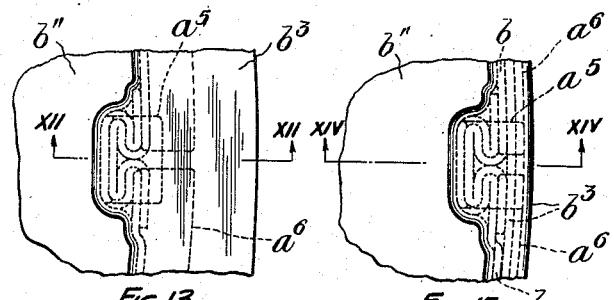
FIG. 13.    FIG. 15.
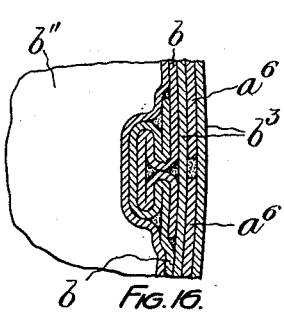
FIG. 16.
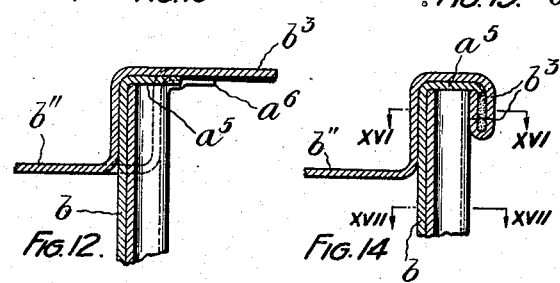
FIG. 12.    FIG. 14.
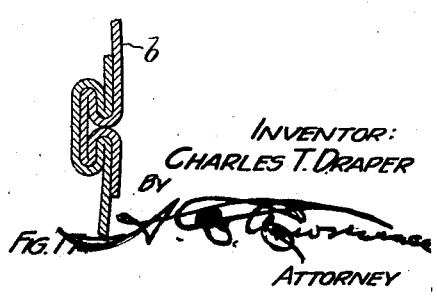
FIG. 17.
INVENTOR:
CHARLES T. DRAPER
BY
ATTORNEY Feb. 18, 1930.  C. T. DRAPER  1,748,036
METHOD OF MAKING SHEET METAL BARRELS OR DRUMS
Filed Dec. 6, 1924  3 Sheets-Sheet 3

INVENTOR:
CHARLES T. DRAPER
ATTORNEY.

Patented Feb. 18, 1930

1,748,036

UNITED STATES PATENT OFFICE

CHARLES T. DRAPER, OF CLEVELAND, OHIO, ASSIGNOR TO THE DRAPER MANUFACTURING COMPANY, OF CLEVELAND, OHIO, A CORPORATION OF OHIO

METHOD OF MAKING SHEET-METAL BARRELS OR DRUMS

Application filed December 6, 1924. Serial No. 754,271.

My invention relates to improvements in method of making sheet metal barrels or drums, and more particularly to the side seam thereof positioned interiorly of the container and terminally constructed to afford a smooth, even head seam, and the method of fabricating the same; my object being the provision of sheet metal containers of larger sizes having an unwelded side seam that is leakproof.
In order to accomplish the object of my invention it has been necessary not only to reverse the position of the seam and fabricate it interiorly of the barrel, but it is desirable to adopt certain means as an adjunct for making the seam more securely leakproof and for permitting a leakproof attachment of the barrel head. Thus the interiorly fabricated side seam of the barrel is the so-called Gordon seam initially provided along three abutting faces with a plastic material or filler, while the corner portions are peculiarly cut away or notched to afford a protective member for the ends of the completed seam and also permit of an even, tightly locked chime seam at the heads.

Hitherto the Gordon seam has been employed for the side seam of small containers, but it has been fabricated exteriorly of the container and required soldering if a liquid-tight joint were desired. Obviously this construction does not lend itself to sheet metal barrels, for the reasons that an exteriorly positioned seam is liable to be damaged, particularly in rolling a barrel, while it is undesirable to weld the seam and it may not be soldered. However, the successive steps of producing a Gordon seam commercially have not previously been attempted in the manufacture of sheet metal barrels and I have necessarily evolved a method for interiorly fabricating this seam within the cylindrical shell or blank.

The details of method and structure may best be explained by making reference to the accompanying drawings, wherein:

Figure 1 is a perspective view of a sheet metal barrel or drum fabricated in accordance with my instant improvements, Fig. 2 is another perspective view of the blank therefor showing the notched corners and the initial interlocking folds at the ends for forming the inner side seam, Fig. 3 is a perspective view of the underside of one of the barrel heads, Figs. 4 and 5 are fragmentary end views upon an enlarged scale, showing the notched ends previous to inserting the grooved portions for forming the interior Gordon seam, Fig. 6 is a fragmentary vertical section through the nested members of the Gordon seam, Fig. 7 is a fragmentary section thereof on the horizontal plane of VII—VII, Fig. 6, Fig. 8 is another fragmentary vertical section through the upper portion of the seam after the pinching step or operation, Fig. 9 is another fragmentary section on line IX—IX, Fig. 8, Fig. 10 is another fragmentary vertical section of the upper portion of the seam after the flanging operation on line X—X, Fig. 11, Fig. 11 is another plan view showing fragments of the flange and the covered Gordon seam from line XI—XI, Fig. 10, Fig. 12 is another fragmentary vertical section similar to Fig. 10 illustrating the head in position for forming the chime seam, taken on line XII—XII, Fig. 13, Fig. 13 is another fragmentary plan view of the structure as assembled in Fig. 12,

Fig. 14 is another vertical section through the upper portion of the head and Gordon seam after the chime seam has been fabricated, on line XIV—XIV, Fig. 15, Fig. 15 is another fragmentary plan view of the parts as fabricated in Fig. 14, Fig. 16 is a composite fragmentary plan and section on line XVI—XVI, Fig. 14, and Fig. 17 is another horizontal fragmentary section on line XVII—XVII, Fig. 14,

Figure 18:
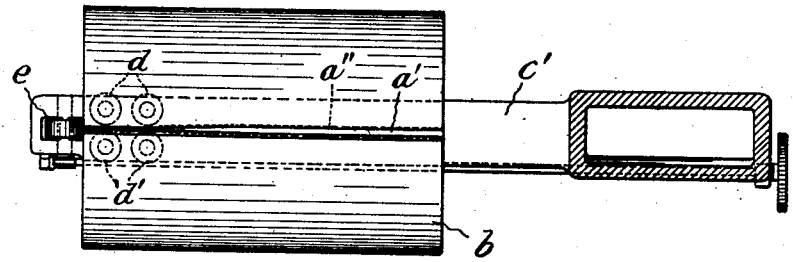
Fig. 18 is a sectional plan view on line XVIII—XVIII, Fig. 19, showing somewhat diagrammatically the method and means for interiorly fabricating the Gordon seam within the shell, Figure 19:
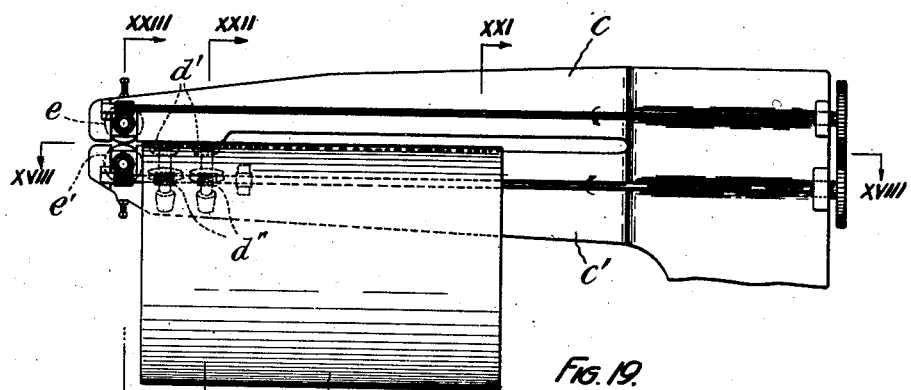
Fig. 19 is a fragmentary side elevation of the shell and fabricating apparatus of Fig. 18.
Figures 20, 21, 22:
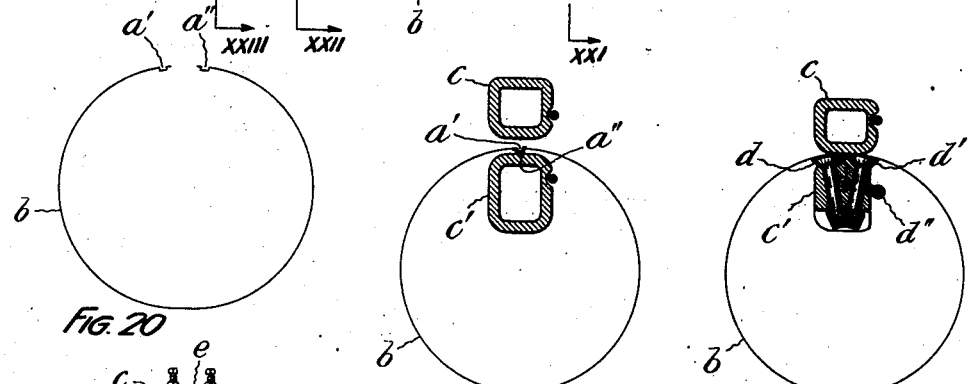
Fig. 20 is a diagrammatic cross-sectional view through the shell after rolling and grooving the same, Figure 23:
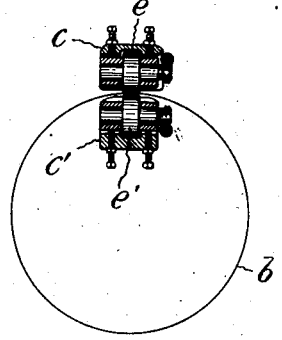

Fig. 21 is a vertical cross-section on line XXI—XXI, Fig. 19, diagrammatically showing the nesting for the initial interlocking of the seam members on the mandrel, Fig. 22 is another vertical cross-section on line XXII—XXII, Fig. 19, illustrating the method and means for pinching the sides of the seam members, and Fig. 23 is another vertical cross-section on line XXIII—XXIII, Fig. 19, illustrating the final compression of the interiorly fabricated Gordon seam within the cylindrical shell.

Throughout the several figures of the drawings I have employed the same character of reference to designate similar parts.

The fabrication of a Gordon seam involves the initial rolling of nesting or interlocking grooves substantially at the opposite ends of the shell or blank upon which the seam is to be produced. This blank, $a$, is well shown in Fig. 2 with the nesting grooves $a'$ and $a''$ rolled at the respective ends thereof. In addition, it will be noted that the lefthand corners $a^3$ are notched and the righthand corners $a^4$ are partially notched to leave the ears $a^5$ intact continuously with the bottom of the groove $a''$. The purpose of this notching will be explained in connection with the description of forming the chime seam.

The completed barrel is shown in Fig. 1 with the interiorly fabricated Gordon seam longitudinally uniting the ends of the body or shell $b$, encircled by the U-section rolling hoops $b'$ and closed by the heads $b''$ slightly recessed at one side to accommodate the upper end of the interior Gordon seam.

Referring now to the third sheet of drawings, it may be explained in connection with the somewhat diagrammatic views thereof how the Gordon seam is successfully fabricated interiorly of the shell and made liquid-tight without welding. Thus the shell $b$ of Fig. 20 is placed between the massive fabricating jaws $c$, $c'$, Fig. 19, and the grooves $a'$, $a''$ are nested; the latter having first been coated along its three sides with a suitable plastic filler as indicated at the right of Fig. 2. The shell is then advanced toward the left between the paired pinching rolls $d$, $d'$ which are driven by the rotated screw $d''$, thereby imparting an inverted V-shaped contour to the side walls of the grooves and exteriorly closing the seam. This interior seam immediately thereafter is subjected to pressure of the horizontal rolls $e$, $e'$ near the ends of the jaws or mandrel, which tightly flattens and closes the side seam of the shell against the interposed plastic filler, as indicated in the enlarged section, Fig. 17. The shell is now ready for sealing the ends of the Gordon seam to prevent any possible longitudinal leakage, and for forming the chime seams with the heads of the container.

The successive steps of nesting, pinching and compressing the interior Gordon seam may be traced in the fragmentary sections of Figs. 6 to 9, following which the terminal ears $a^5$ are bent down over the ends of the interior Gordon seam concurrently with the formation of the upper flange $a^6$, Fig. 11. It will be seen that these members $a^5$ effectively close the notched ends of the Gordon seam, hence longitudinal leakage is prevented, particularly as these ends are also sealed by the plastic cement.

Referring now to the showing of Figs. 12 to 16, it will be observed that the head flange $b^3$ is interlocked with the shell flange $a^6$ to form the chime seam circumferentially of the shell and about the covered Gordon seam, preferably protected, as well, by the plastic filler indicated in Figs. 3, 14 and 16. Thus the chime seam is exteriorly flush as shown in Figs. 1 and 15. It therefore is not subjected to injury from rolling the barrel as would be a protruding exterior overfolding of the members.

The Gordon seam, it will be observed, is protected both longitudinally and terminally by the enclosed plastic filler provided on all of the engaging faces. This filler is interposed between the abutting surfaces of the metal and sufficiently overcomes minor variances in the seams primarily caused by minor differences in the thickness or gauge of the sheet metal. The filler or cement may be applied as a solution of gutta percha, or asphaltum, or a liquid pitch, for example, depending upon the character of the expected contents of the container.

The apparatus somewhat diagrammatically shown in the last sheet of the drawings for practicing the disclosed method is not herein claimed as a part of my invention but is referred to as embodying suitable means of preferred type for fabricating the inner seam of a large sheet metal container. The rolls thereof preferably are driven by worms and gears, as best shown in Fig. 19, while sufficient space for nesting the grooves formed on the shell preferably is provided rearwardly of rigidly mounted jaws, as shown.

The sheet metal drum or barrel of my invention has been found to meet every standard test and requirement of a container fabricated with the more expensive and less desirable welded seam, while it is cheaper to construct.

Having now described a sheet metal container embodying my improvements and the method whereby it may most advantageously be fabricated, I claim as new and desire to secure by Letters Patent, together with such departures as may be made by the exercise of the usual or expected skill in the art, the following:

1. The herein described method of fabricating a liquid-tight sheet metal barrel or drum with an unwelded side seam, which consists in forming inwardly extending nesting grooves adjacent to the ends of the sheet metal blank, notching its corners, applying a plastic filler intermediately of the nesting grooves, interlocking said grooves, subjecting the upper portions thereof to a progressive pinching operation for exteriorly closing the side seam, flattening said seam interiorly of the completed shell, and thereafter seaming the heads upon the ends of said shell and across the notched corners, substantially as set forth.

2. The herein described method of providing an end seal for the side seam of a sheet metal container, which consists in notching the corners of the blank to provide protective ears at each end of the completed shell, closing the side seam, and bending the ears securely over said seam at each end to seal the same against longitudinal leakage, substantially as set forth.

3. The herein described method of producing a liquid-tight Gordon seam for sheet metal containers, which consists in notching the corners of the blank to provide protective ears at each end of the completed shell, forming nesting straight-sided grooves at each end of the blank, interposing a plastic filler along the abutting straight sides and bottoms of the nested grooves, interlocking the grooves, closing the side seam, and bending the ears securely over said seam at each end to seal it against longitudinal leakage, substantially as set forth.

4. The herein described method of producing an inner Gordon seam for sheet metal containers, which consists in notching the corners of the sheet metal blank, forming straight-sided nesting grooves adjacent to its ends, positioning said blank about the seam-forming means, nesting said grooves in interiorly extending position with respect to the shell, and subjecting the nested grooves to the seam-forming means interiorly of the completed shell, substantially as set forth.

In testimony whereof I do now affix my signature.

CHARLES T. DRAPER.